US012216985B2

(12) United States Patent
Druck et al.

(10) Patent No.: US 12,216,985 B2
(45) Date of Patent: *Feb. 4, 2025

(54) ANALYSIS AND RESTRUCTURING OF WEB PAGES OF A WEB SITE

(71) Applicant: Graphite Growth, Inc., San Francisco, CA (US)

(72) Inventors: Gregory Druck, San Francisco, CA (US); Ethan Smith, San Francisco, CA (US); Marcos Ciarrocchi, Miami, FL (US); Jerick Ordenes, Merida (VE)

(73) Assignee: Graphite Growth, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,822

(22) Filed: Mar. 7, 2024

(65) Prior Publication Data

US 2024/0211679 A1 Jun. 27, 2024

Related U.S. Application Data

(63) Continuation of application No. 17/963,706, filed on Oct. 11, 2022, now Pat. No. 11,960,820.

(Continued)

(51) Int. Cl.
*G06F 16/958* (2019.01)
*G06F 16/953* (2019.01)
(Continued)

(52) U.S. Cl.
CPC .......... *G06F 40/134* (2020.01); *G06F 16/953* (2019.01); *G06F 16/954* (2019.01);
(Continued)

(58) Field of Classification Search
CPC .... G06F 40/134; G06F 16/953; G06F 16/954; G06F 16/958; G06F 40/194; G06F 40/30; G06F 16/986; G06F 40/143
See application file for complete search history.

(56) References Cited

U.S. PATENT DOCUMENTS 8,447,751 B2 5/2013 Stouffer et al.
2002/0198875 A1 12/2002 Masters
(Continued)

FOREIGN PATENT DOCUMENTS

EP 2560111 A2 2/2013

OTHER PUBLICATIONS

Durga. "Having too Many Internal Links on a Page is Good or Bad for SEO?" Kloud Portal, Jul. 13, 2021, 7 pages, [Online] [Retrieved Sep. 17, 2023], Retrieved from the Internet <URL:https://www.kloudportal.com/having-too-many-internal-links-on-a-page-is-good-or-bad-for-seo/>.

(Continued)

*Primary Examiner* — Sanchita Roy
(74) *Attorney, Agent, or Firm* — Fenwick & West LLP

(57) ABSTRACT

A structural analysis system analyzes the pages of a web site, including the content of the pages and their relationships to each other. Based on the analysis, the structural analysis system additionally modifies (or suggests modification of) the web pages of the web site, such as by altering the inter-page linking structure of the web site. This improves the structure of the web site, leading search engines to be able to more quickly find and index its pages, as well as increasing the expected ranking that a search engine would provide to pages of the web site within the set of search results provided by the search engine in response to a user query.

20 Claims, 3 Drawing Sheets

Related U.S. Application Data

(60) Provisional application No. 63/254,521, filed on Oct. 11, 2021.

(51) Int. Cl.
  *G06F 16/954* (2019.01)
  *G06F 40/134* (2020.01)
  *G06F 40/194* (2020.01)
  *G06F 40/30* (2020.01)

(52) U.S. Cl.
  CPC .......... *G06F 16/958* (2019.01); *G06F 40/194* (2020.01); *G06F 40/30* (2020.01)

(56) References Cited

U.S. PATENT DOCUMENTS

| | | |
|---|---|---|
| 2007/0094250 A1 | 4/2007 | Kapur |
| 2015/0254251 A1 | 9/2015 | Adams et al. |
| 2018/0307768 A1 | 10/2018 | Hu |
| 2019/0121909 A1 | 4/2019 | Dechu et al. |

OTHER PUBLICATIONS

PCT International Search Report and Written Opinion, PCT Application No. PCT/IB2022/059755, Jan. 20, 2023, 10 pages.
United States Office Action, U.S. Appl. No. 17/963,706, filed Sep. 21, 2023, six pages.

ANALYSIS AND RESTRUCTURING OF WEB PAGES OF A WEB SITE

RELATED APPLICATIONS

This application is a continuation of U.S. patent application Ser. No. 17/963,706, filed Oct. 11, 2022 which claims the benefit of Provisional Application No. 63/254,521, filed on Oct. 11, 2021, which is incorporated herein by reference.

FIELD OF ART

This disclosure relates generally to the field of online computer systems, and more specifically, to analysis and modification of web site structure.

BACKGROUND

A web site's overall value to users depends upon various factors, such as the site's content and its relevance to the user's queries, and the relationships of the various pages making up the site, such as the structure of links between the different pages on the site. Some automated programs, such as internet search engines, assess and quantify this value and use it when ranking the pages that will be included in the search results for a given user's query. Poor design of the structure of a web site can inadvertently result in the pages of that site being afforded a lower ranking in search results than they would have been had the site been more appropriately-structured, leading web sites with content that would have been beneficial to the querying user to be effectively omitted from the search results shown to the user.

SUMMARY

A structural analysis system analyzes the pages of a web site, including the content of the pages and their relationships to each other. Based on the analysis, the structural analysis system additionally modifies (or suggests modification of) the web pages of the web site, such as by altering the inter-page linking structure of the web site. This improves the authority and relevance of the web site and thereby increases the expected ranking that a search engine would provide to pages of the web site within the set of search results provided by the search engine in response to a user query.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
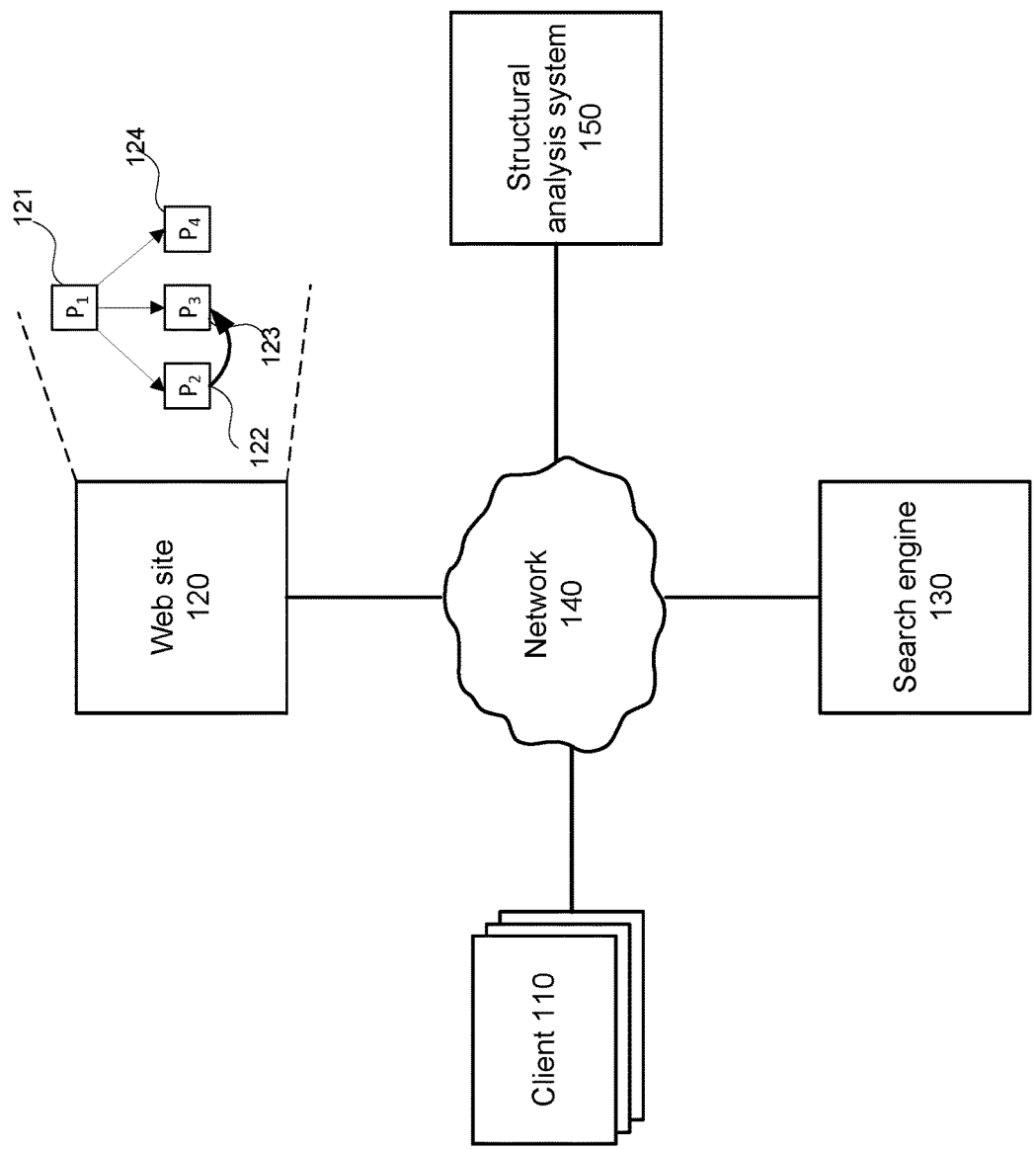
FIG. 1 illustrates the components of an environment in which users perform searches for web pages or other content over a computer network, and a structural analysis system assists a web site in improving its structure and/or content, according to some embodiments.

FIG. 1 illustrates the components of an environment in which users perform searches for web pages or other content over a computer network, and a structural analysis system assists a web site in improving its structure and/or content, according to some embodiments.

Users use client devices 110 to query a search engine 130 for content that is of relevance to them. The search engine 130 consults its index to find content that is most appropriate for the query, returning a set of search results (e.g., links to web pages) to the client device 110. The search engine 130 had previously created its search index by crawling the web pages of web sites 120, analyzing their content and structure and storing pertinent representative information about the pages within the index. When the search engine 130 returns search results to a client device 110, it generates a score for each of the potential search results, ranking them and returning the highest-ranking set of search results in response to the user's query. The search engine score may be a function of various considerations, such as the relevance of the page's content to the query, and/or the "authority" that the page has (e.g., a reputation as determined by pages linking to it). A structural analysis system 150 analyzes the structure and/or content of web pages of a web site 120 and, based on the analysis, modifies that structure and/or content in order to enhance the site structure and make its site more valuable to users. As a result of the modification, the search engine 130 is more likely to afford the web pages of the web site a higher ranking within search results, and accordingly the users are more likely to see those web pages within the search results. These various components are now described in additional detail.

The client devices 110 are computing devices such as smart phones, laptop computers, desktop computers, or any other device that can submit a query for content to a search engine 130 over a network 140.

The search engine 130 can be any system that indexes content and provides search results in response to user queries, such as those of GOOGLE, MICROSOFT BING, or YAHOO, for example.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The web site 120 includes a collection of web pages, e.g., documents written in HTML. The web site 120 is typically defined as all the pages made available under a given domain, such as those accessed via the base domain URL, such as http://www.<domain>.com, for some domain <domain>. The web pages may contain links to other web pages (e.g., <A> anchor tags in HTML). In the simplified example of FIG. 1 of a set of web pages $P_1$ to $P_4$, $P_1$ is the root page of the website, and $P_2$ to $P_4$ are pages linked to by the root page. For example, $P_1$ could be the introductory page for the root of a company web site, and $P_2$ to $P_4$ could respectively be the main "Products", "Resources", and "Company" pages for the company. The link from $P_2$ to $P_3$ in such an example would indicate that the Products page is making a reference to the Resources page. The web site 120 may be represented as a graph, with pages being the nodes of the graph and unidirectional links between the nodes corresponding to links or other references from one page to another.

It is appreciated that FIG. 1 is minimalistic for the sake of simplicity, and other variations are equally possible. For example, there could be any number of client devices 110, and the structural analysis system 150 could operate on any number of web sites 120 controlled by the same organization or by different organizations.

Figure 2:
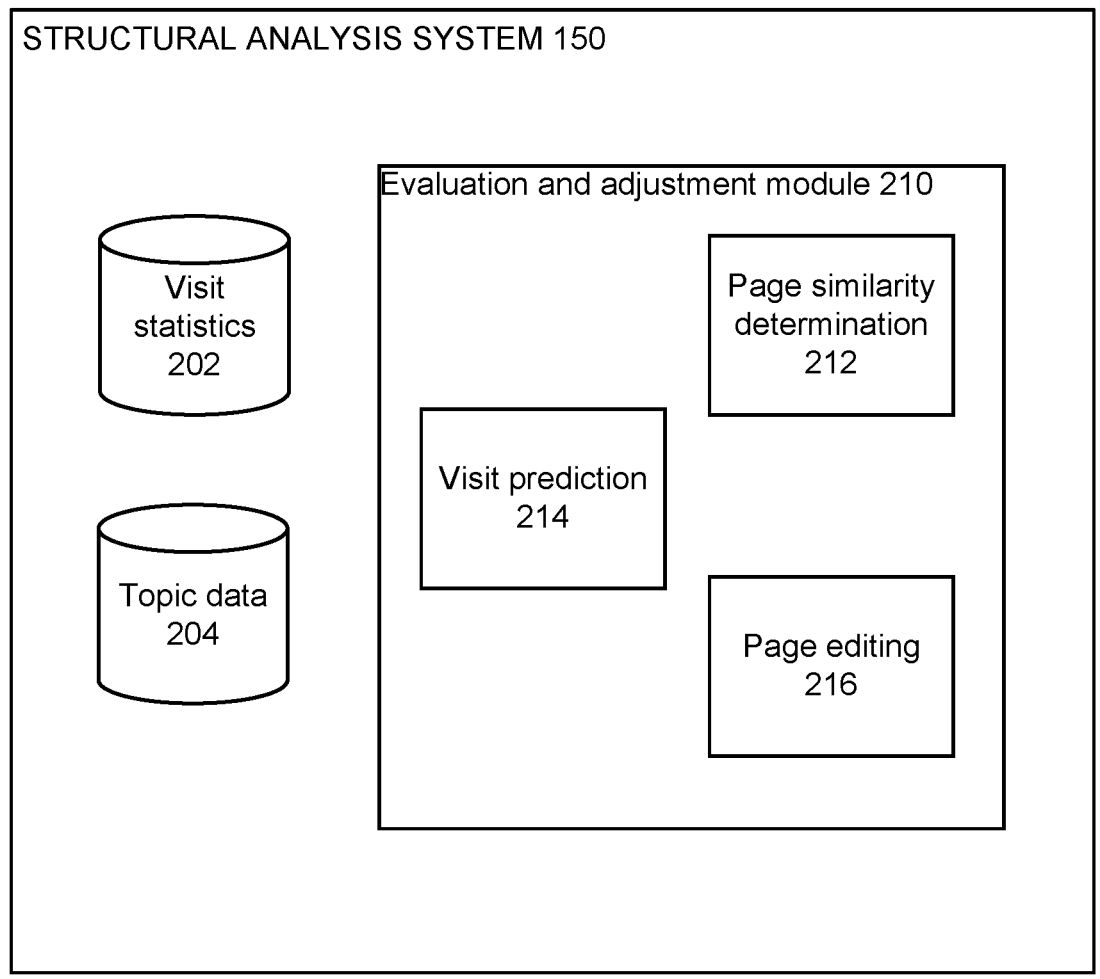
FIG. 2 illustrates the components of the structural analysis system of FIG. 1 when evaluating and adjusting the structure of a web site, according to some embodiments.

FIG. 2 illustrates the components of the structural analysis system 150 of FIG. 1 when evaluating and adjusting the structure of a web site 120, according to some embodiments.

The structural analysis system 150 analyzes some or all of the pages of the web site 120. The evaluation and adjustment module 210 performs the analysis of the structure and/or content of the web site 120, as well as altering that structure and/or content in order to increase its perceived value. The evaluation and adjustment module 210 includes a page similarity determination module 212 and a page editing module 216 that it uses for these purposes, and in some embodiments, it further includes or uses a set of visit statistics 202, topic data 204, and/or a page visit prediction module 214.

In general, effective web sites 120 have certain characteristics, such as: each page being reachable from any other page of the site (which enables search engine bots to index every page), multiple incoming links to each page, small average shortest paths between all pairs of pages of the web site, many possible paths between all pairs of pages, and low variance in the authority scores afforded to the pages of the web site by the search engine 130 (e.g., the PageRank™ scores of the Google™ ranking algorithm). The techniques used by the evaluation and adjustment module 210 in different embodiments aim to enhance some or all of these characteristics for the web site 120, such that the aggregate value of the web site pages is increased. As an additional benefit, adjustments such as site link structure revisions tend to allow the search engine 130 to find and index the pages of the site more quickly, and to visit the pages for indexing more frequently.

The page similarity determination module 212 quantifies a degree of similarity of two web pages of the web site 120, according to a particular similarity metric, s. Page similarity is related to page relevance, since pages with similar content will tend to have similar degrees of relevance to a user query. In some embodiments, for example, the similarity s of two pages $p_i$ and $p_j$—$s(p_i, p_j)$—is defined as a semantic similarity between the pages, based on a similarity of the words and phrases (e.g., in the titles, body text, or tags), or of their embeddings, in the pages $p_i$ and $p_j$. In other embodiments, the similarity is computed based on extrinsic data outside the content of the pages themselves, such as co-view statistics. In such embodiments, the page similarity determination module 212 uses the visit statistics 202 (described later) to quantify the extent to which $p_i$ and $p_j$ were "co-viewed" (e.g., both viewed during the same browser session), with a higher amount of co-view leading to higher scores. In some embodiments, the co-view data is used to train a discriminative model that computes similarities between pairs of pages, with the degree of co-view data acting as labels for training, indicating to what extent a pair of pages is similar, and the feature vectors being derived from the semantic content features (textual words/phrases) of the pages.

The page editing module 216 changes the structure/content of the web pages according to the factors such as the similarity metric computations of the page similarity determination module 212. The page editing module 216 can make different types of changes to the web pages. One type of change is the addition of links within the web pages of the site 120 to other pages on the same site. This increases the interconnectedness of the pages on the site 120. Another type of change is modification of anchor text of links to optimize ranking for specific searches. The below describes in more detail various factors that determine which pages on the site 120 should be linked to which other pages.

Changes to the web site 120, such as the adjustment of link structure, tend to more evenly "spread" the links within the site, which avoids the problem of "hub" pages on a site that receive a disproportionately large numbers of links. This makes the web site 120 easier to find for a search engine 130, leading the pages of the site to be indexed by the search engine sooner and more frequently, as well as to appear more prominently (e.g., higher) within search results.

The evaluation and adjustment module 210 uses the page similarity determination module 212 to assess page similarity and the page editing module 216 to make changes to the web site 120 as a result of the assessment. Different embodiments accomplish this according to different specific techniques. For example, a first embodiment optimizes the objective function maxG $\Sigma\{(p_i,p_j) \in G\}$ $w(p_i,p_j)$—that is, it maximizes the aggregate weight value w over all pairs of pages $<p_i, p_j>$ in the graph G that constitutes the web site 120. In some embodiments, the weight w is the similarity score of the page pairs; in other embodiments, other information is incorporated into w, such as the traffic at the source or destination, the traffic gap, or the difference between these statistics at the source and destination. Constraints may also be added to the optimization: $\forall p$ a≤|incoming_links(p)|≤b, and $\forall p$ c≤|outgoing_links(p)|≤d—that is, any page p must have between a and b incoming links from other pages and between c and d outgoing links to other pages. Note that some settings of a, b, c, and d may make the problem infeasible. For example, for the total number of incoming and outgoing links to be the same, it cannot be the case that b<c, or d<a. The bounds on link counts a, b, c, and d of the above-listed constraints are predetermined and fixed in some embodiments; in others (such as some of those discussed below), the maximum link counts are determined on a page-by-page basis. In other embodiments, a, b, c, and d are not hard constraints; rather, link counts violating the bounds a, b, c, and d result in penalties in the objective function that tend to discourage excessive linking. In some embodiments, the graph G over which the objective function is optimized includes only a subset of the web site. In some embodiments, the nodes of the graph G are partitioned into distinct subsets (e.g., a subset for each of the various different languages that a site supports, such as English and Spanish), and the objective function may include constraints that prohibit links from some subsets to others.

The objective function is an integer linear program (ILP) and is optimized in different ways in different embodiments. In the ILP formulation of the problem, there is a variable $x_{ij}$ for each possible link (O(n2) variables with n pages) between a pair of pages $<p_i, p_j>$. $x_{ij}=1$ represents the presence of a link from page i to j, and 0 represents the absence of a link. Each possible link has a relevance score. The aim is to maximize the sum of weights for the selected links, or the dot product between x and the vector of edge weights. The constraints bound the number of incoming and outgoing links. For example, to bound the number of incoming links to the range [a, b], a constraint $a \leq \Sigma_i x_{ij} \leq b$ is added for each j. And similarly for outgoing links. The optimized link graph is then the graph defined by $x_{ij}=1$ in the optimal solution. In some embodiments, existing links within the web site, or links to web pages of the site from external sites, are included in the optimization; these links can be represented as fixed values of 1 for some variables in the ILP.

In one embodiment, the objective function is solved with an ILP problem solver.

In a different embodiment, a greedy algorithm iterates over all the pages b times, adding a link from a page to the other most similar page. This is expressed in the pseudocode of Listing 1:

Listing 1

```
available_destinations = set(pages)
incoming_count = { }
for i in range(b):
    for p in pages:
        q = argmax( w(p, p') for p' in available_destinations, p != p' )
        add_link(p, q)
        incoming_count[q] += 1
        if incoming_count[q] >= d:
            available_destinations.remove(q)
```

Thus, in Listing 1, for each page p, the page p' having the highest weight (in some embodiments the greatest degree of similarity for the similarity metric s) is linked to p, provided that p' can be linked to no more than d times. Note that this algorithm does not guarantee that the incoming and outgoing link constraints are satisfied, and does not guarantee an optimal solution to the ILP, but empirically this algorithm produces solutions which are very similar to the ILP solution (within 5% of the objective function value and almost all constraints satisfied) while being orders of magnitude faster.

Embodiments Using Page Visit Estimation

In some embodiments, information about web site traffic and web page topics is used to estimate how many user visits to the various pages should be expected. The difference between how much those pages were expected to be visited and how much they have actually been observed to be visited (referred to as the "traffic gap") can be computed, and this difference can be used as an additional factor in determining how to perform the linking of the pages. In such embodiments, the structural analysis system 150 stores or has access to visit statistics 202 and topic data 204, as well as a page visit prediction module 214. The page visit prediction module 214 uses the visit statistics 202 and the topic data 204 to estimate how many user visits to the various pages should be expected. These components are now described in more detail.

The visit statistics 202 provide data about visits to the different pages of the web site 120. The statistics 202 either directly store counts of how many times the pages have been visited, or else such counts can be inferred from the statistics 202. The statistics 202 may be obtained, for example, from the web site 120 itself.

The topic data 204 organize the possible categories of content as a set of topics, each topic in turn having a set of corresponding keywords that are representative of that topic.

In some embodiments, the topics are arranged in a graph whose links indicate relatedness between the linked topics.

The visit prediction module 214 calculates a prediction of how many times pages with the topic would be expected to be visited within the web site 120. In one embodiment, the calculation is as follows:

$$\text{visits}_{expected(t,d)} \left( \sum_{k \in t} \text{searches}(k) * searchCTR(k, t, d) \right)$$

$$\text{visits}_{expected(t,d)} \left( \sum_{k \in t} \text{searches}(k) * searchCTR(k, t, d) \right) =$$

$$\left( \sum_{k \in t} \text{searches}(k) * \sum_{rank} p(\text{rank} \mid t, d) * CTR(\text{rank}, k, t) \right)$$

where t represents a particular topic, d represents the particular domain of the web site, and k represents a particular keyword. In turn, searches(k) is the search volume for keyword k in the search engine 130, and may be computed based on various databases and APIs provided by the search engine 130 or others.

To compute CTR(rank, k, t), CTR representing a click-through rate of k within search results, the visit prediction module 214 gathers data of the form (k, rank, URL, CTR) from the search engine 130 (e.g., in the case of the Google™ search engine, via Google Search Console). This can be used to estimate CTR at position m averaged over all keywords. For a particular keyword k of interest there may not be sufficient CTR estimates in the collected data set. Accordingly, the visit prediction module 214 trains a model to predict the CTR at a particular rank given a particular topic t and keyword k; in some embodiments multiple models are trained to predict CTR for different segments of the keyword search volume, such as the head or the long tail, or the search volume is given as an input to the trained model. In one embodiment, this model is a deep regressor that uses embeddings of the specific keyword and or topic, as well as an embedding of the rank. The model may be set up to predict a topic-specific adjustment to the topic-independent estimate: CTR_estimate(rank)+CTR_adjustment(rank, k, t), where CTR_adjustment comes from the model.

In a first embodiment using the visit prediction (that is, the computed value visits_expected(t, d)), the link count bounds a, b, c and d of the above-listed constraints are computed dynamically for the pages based on extrinsic statistical data for those pages. The maximum link counts can then be set separately for the various pages, based on the discrepancy between how much those pages were expected to be visited and how much they have actually been observed to be visited. For example, the maximum link counts for pages can be made an increasing function of the discrepancy, such as by setting the maximums so that the pages with the top 20% highest discrepancies receive up to 20 links instead of up to 10.

In a second embodiment using the visit prediction, the discrepancies are used to set the link weight w(p, p') for each pair of pages <p, p'>. For example, w(p, p') can be set to larger values as the discrepancies and the number of visits to the pages themselves become larger. The pages to link are then determined by incorporating opportunity weights into the edge weights, such as by multiplying opportunity weights and similarities, e.g., w(p, p')*s(p, p').

In some embodiments, pages to link are additionally and/or alternatively identified using simpler techniques, such as by identifying newly-created pages, or pages having low traffic, on the assumption that these pages have significant opportunity for improvement.

Figure 3:
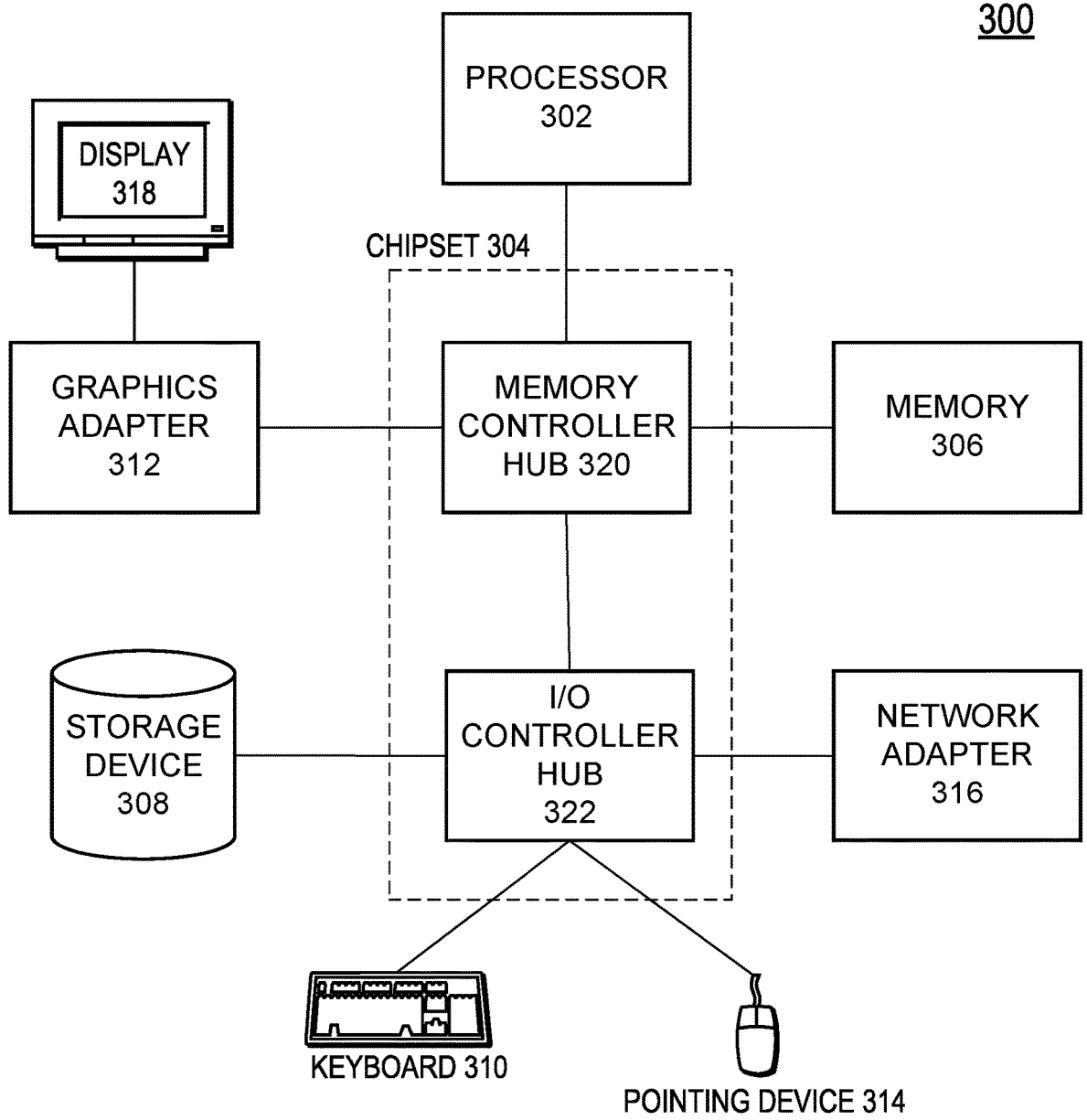
FIG. 3 is a high-level block diagram illustrating physical components of a computer used as part or all of the structural analysis system, client, web site, or search engine from FIG. 1, according to one embodiment.

FIG. 3 is a high-level block diagram illustrating physical components of a computer 300 used as part or all of the structural analysis system 150, client 110, web site 120, or search engine 130 from FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein.

What is claimed is:

1. A computer-implemented method for improving a determined search engine ranking of a plurality of pages of a website by analyzing and adjusting a link structure of the website, the method comprising:
   quantifying degrees of semantic similarity between pairs of pages of the plurality of pages on the website according to a similarity metric;
   for each page of the plurality of pages of the website:
      determining a total count of incoming links to the page from other pages of the plurality of pages of the website;
      determining a total count of outgoing links from the page to other pages of the plurality of pages;
      determining a relevance score for a modified link structure for the website, the relevance score based on the quantified degrees of semantic similarity between pairs of pages on the website, the total count of incoming links of each page and the total count of outgoing links of each page; and
   adding additional links between pairs of pages on the website to solve an optimization problem that maximizes the relevance score of the modified link structure for the website.

2. The computer-implemented method of claim 1, further comprising:
   determining, for each page of the plurality of pages, whether the determined total count of incoming links is less than a threshold number of incoming links, and
   wherein adding additional links between pairs of pages to solve the optimization problem is additionally based on determining that the respective page has the total count of income links that is at most the threshold number of incoming links.

3. The computer-implemented method of claim 1, further comprising:
   determining, for each page of the plurality of pages, whether the determined total count of outgoing links is less than a threshold number of outgoing links, and
   wherein adding additional links between pairs of pages to solve the optimization problem is additionally based on determining that the respective page has the total count of outgoing links that is less than the threshold number of outgoing links.

4. The computer-implemented method of claim 1, wherein quantifying the degrees of the similarity comprises analyzing at least one of page titles, page body text, or page tags.

5. The computer-implemented method of claim 1, wherein adding additional links between pairs of pages to solve the optimization problem comprises optimizing an assignment of the links between pages to maximize an aggregate similarity of pairs of pages on the website.

6. The computer-implemented method of claim 1, wherein adding links between pairs of pages comprises iteratively adding links from a page to a most similar page according to semantic similarity between the pages.

7. The computer-implemented method of claim 1, further comprising computing the total count of incoming links individually for each page by:
   determining a topic for the page;
   computing a predicted number of visits for pages having the topic;
   computing a traffic gap for a page by comparing the predicted number of visits for pages having the topic to an observed actual number of visits for the page; and
   determining a relevance score for a modified link structure for the website is based on the traffic gap.

8. A non-transitory computer-readable storage medium storing instructions for improving a determined search engine ranking of a plurality of pages of a website by analyzing and adjusting a link structure of the website, the instructions, when executed by one or more processors, causing the one or more processors to:
   quantify degrees of semantic similarity between pairs of pages of the plurality of pages on the website according to a similarity metric;
   for each page of the plurality of pages of the website:
      determine a total count of incoming links to the page from other pages of the plurality of pages of the website;
      determine a total count of outgoing links from the page to other pages of the plurality of pages;
      determine a relevance score for a modified link structure for the website, the relevance score based on the quantified degrees of semantic similarity between pairs of pages on the website, the total count of incoming links of each page and the total count of outgoing links of each page; and
   add additional links between pairs of pages on the website to solve an optimization problem that maximizes the relevance score of the modified link structure for the website.

9. The non-transitory computer-readable storage medium of claim 8, wherein the instructions, when executed by the one or more processors, cause the one or more processors to:
   determining, for each page of the plurality of pages, whether the determined total count of incoming links is less than a threshold number of incoming links, and
   wherein adding additional links between pairs of pages to solve the optimization problem is additionally based on determining that the respective page has the total count of income links that is at most the threshold number of incoming links.

10. The non-transitory computer-readable storage medium of claim 8, wherein the instructions, when executed by the one or more processors, cause the one or more processors to:
   determining, for each page of the plurality of pages, whether the determined total count of outgoing links is less than a threshold number of outgoing links, and
   wherein adding additional links between pairs of pages to solve the optimization problem is additionally based on determining that the respective page has the total count of outgoing links that is less than the threshold number of outgoing links.

11. The non-transitory computer-readable storage medium of claim 8, wherein quantifying the degrees of the similarity further causes the one or more processors to:
   analyze at least one of page titles, page body text, or page tags.

12. The non-transitory computer-readable storage medium of claim 8, wherein adding additional links between pairs of pages to solve the optimization problem further causes the one or more processors to:
   optimize an assignment of the links between pages to maximize an aggregate similarity of pairs of pages on the website.

13. The non-transitory computer-readable storage medium of claim 8, wherein adding links between pairs of pages further causes the one or more processors to:
   iteratively add links from a page to a most similar page according to semantic similarity between the pages.

14. The non-transitory computer-readable storage medium of claim 8, wherein the instructions, when executed by the one or more processors, cause the one or more processors to:
compute the total number of incoming links individually for each page by:
determining a topic for the page;
computing a predicted number of visits for pages having the topic;
computing a traffic gap for a page by comparing the predicted number of visits for pages having the topic to an observed actual number of visits for the page; and
determining a relevance score for a modified link structure for the website is based on the traffic gap.

15. A system comprising:
one or more processors; and
a non-transitory computer-readable storage medium storing instructions for improving a determined search engine ranking of a plurality of pages of a website by analyzing and adjusting a link structure of the website, the instructions, when executed by one or more processors, causing the one or more processors to:
quantify degrees of semantic similarity between pairs of pages of the plurality of pages on the website according to a similarity metric;
for each page of the plurality of pages of the website:
determine a total count of incoming links to the page from other pages of the plurality of pages of the website;
determine a total count of outgoing links from the page to other pages of the plurality of pages;
determine a relevance score for a modified link structure for the website, the relevance score based on the quantified degrees of semantic similarity between pairs of pages on the website, the total count of incoming links of each page and the total count of outgoing links of each page; and
add additional links between pairs of pages on the website to solve an optimization problem that maximizes the relevance score of the modified link structure for the website.

16. The system of claim 15, wherein the instructions, when executed by the one or more processors, cause the one or more processors to:
determining, for each page of the plurality of pages, whether the determined total count of incoming links is less than a threshold number of incoming links, and
wherein adding additional links between pairs of pages to solve the optimization problem is additionally based on determining that the respective page has the total count of income links that is at most the threshold number of incoming links.

17. The system of claim 15, wherein the instructions, when executed by the one or more processors, cause the one or more processors to:
determining, for each page of the plurality of pages, whether the determined total count of outgoing links is less than a threshold number of outgoing links, and
wherein adding additional links between pairs of pages to solve the optimization problem is additionally based on determining that the respective page has the total count of outgoing links that is less than the threshold number of outgoing links.

18. The system of claim 15, wherein quantifying the degrees of the similarity further causes the one or more processors to:
analyze at least one of page titles, page body text, or page tags.

19. The system of claim 15, wherein adding additional links between pairs of pages to solve the optimization problem further causes the one or more processors to:
optimize an assignment of the links between pages to maximize an aggregate similarity of pairs of pages on the website.

20. The system of claim 15, wherein adding links between pairs of pages further causes the one or more processors to:
iteratively add links from a page to a most similar page according to semantic similarity between the pages.

* * * * *